Figure 8:
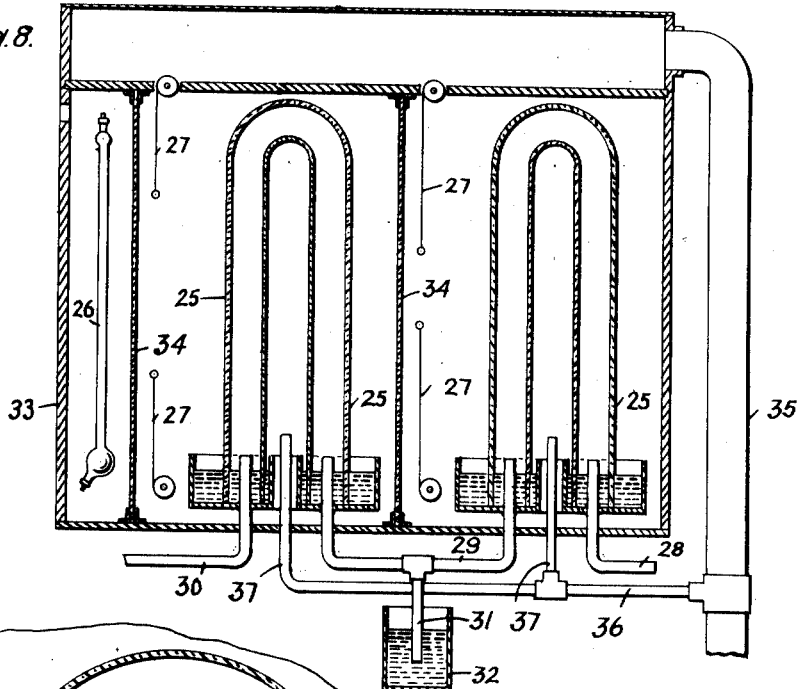

W. O. SNELLING.
PHOTOCHEMICAL APPARATUS.
APPLICATION FILED NOV. 22, 1916.
1,365,740.
Patented Jan. 18, 1921.
2 SHEETS—SHEET 1.
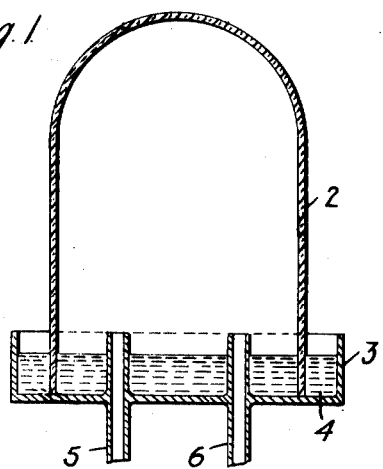
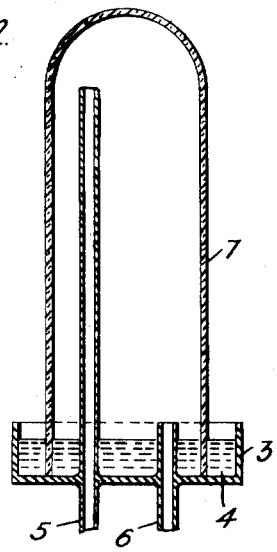
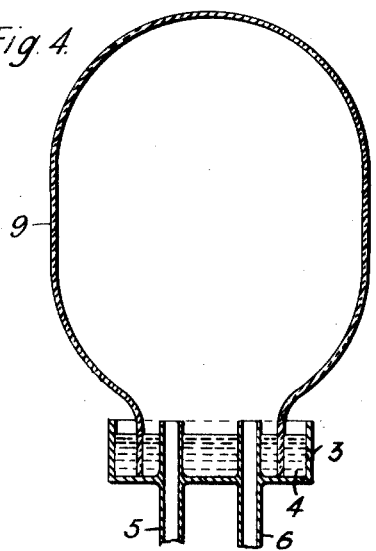
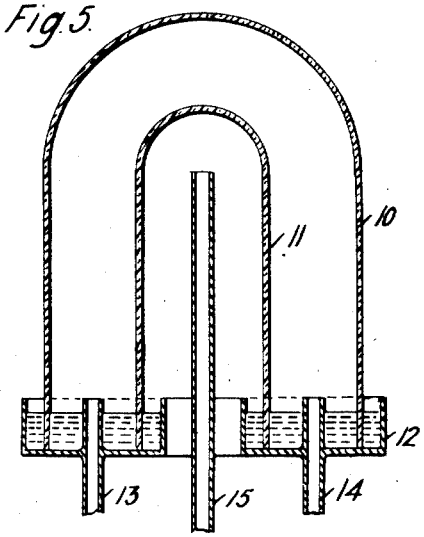
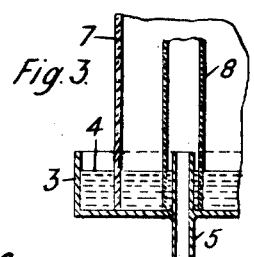
WITNESSES:
INVENTOR
BY
ATTORNEY

W. O. SNELLING.
PHOTOCHEMICAL APPARATUS.
APPLICATION FILED NOV. 22, 1916.

1,365,740.

Patented Jan. 18, 1921.
2 SHEETS—SHEET 2.

WITNESSES:

INVENTOR
BY
ATTORNEY

UNITED STATES PATENT OFFICE.

WALTER O. SNELLING, OF LONG ISLAND CITY, NEW YORK.

PHOTOCHEMICAL APPARATUS.

1,365,740.  Specification of Letters Patent.  Patented Jan. 18, 1921.

Application filed November 22, 1916. Serial No. 132,869.

*To all whom it may concern:*

Be it known that I, WALTER O. SNELLING, a citizen of the United States, and a resident of Long Island City, in the county of Queens and State of New York, have invented a new and useful Improvement in Photochemical Apparatus, of which the following is a specification.

My invention relates to apparatus for performing photochemical reactions involving the exposure of mixtures of liquid or gaseous reagents to actinic rays for the purpose of inducing or facilitating their interaction, and it is my object to provide apparatus of this character comprising transparent reaction vessels of globular or dome shape, having no joints through which reagents may escape and provided with inlet and outlet conduits extending through liquid seals, the sealing liquids being preferably composed wholly or in part of liquid reaction products that are formed in the reaction vessels.

Certain chemical reactions are brought about or accelerated by the action of light, particularly substitutive reactions between the halogens and hydrogen or hydrocarbons. Well known examples of such photochemical reactions are the reactions between hydrogen and chlorin to form hydrochloric acid and between methane and chlorin to form methyl chlorid, methylene chlorid, chloroform and carbon tetrachlorid. Such reactions tend to proceed with explosive violence and are therefore of little technical value unless means are provided for materially reducing the reaction velocity.

Figures 6, 7:
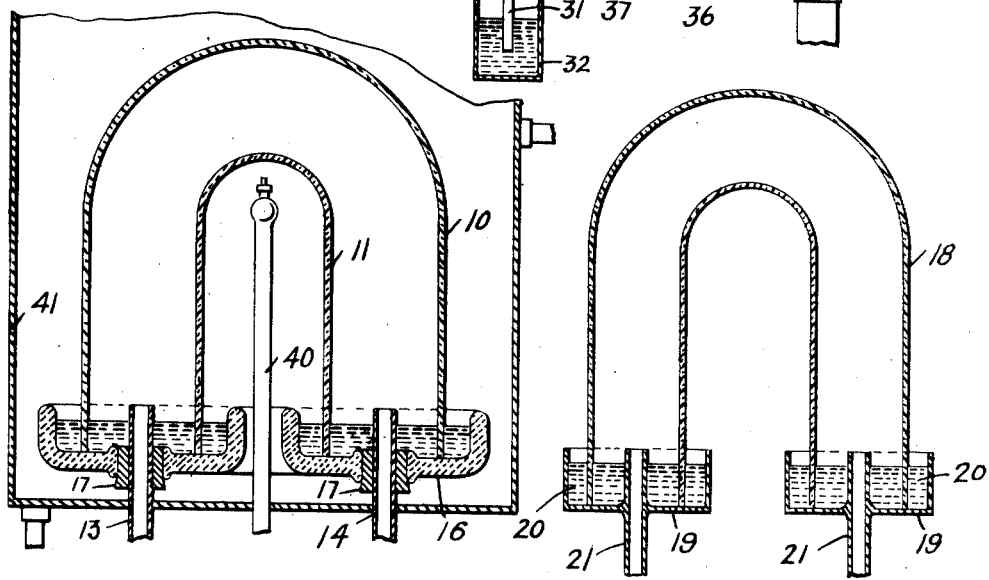

In my copending application for Letters Patent, Serial No. 776,834, filed July 1, 1913, I have described and claimed a method of decelerating photochemical reactions by causing mixtures of reactive gases or liquids to approach a source of actinic light by a path that crosses and recrosses the path of the light rays, so that the light which reaches the entering reactive mixture has passed through several bodies of partially combined reagents acting as screens or filters. The light is thus gradually deprived of its chemical energy with respect to the particular reaction being performed, while the reactive mixture, progressing in countercurrent relation to the light rays, meets with light of greater and greater chemical energy as it advances, and as the tendency toward high reaction velocity decreases by reason of the progressive completion of the reaction. My present invention is concerned with certain forms of apparatus which I have found to be useful in carrying out this general process, examples of such apparatus embodying my invention being shown in the accompanying drawings, in which:

Figure 1 is a central vertical sectional view of a reaction device consisting of an inverted dome-shaped vessel provided with a liquid seal and with inlet and outlet conduits extending through the seal. Fig. 2 is a vertical sectional view similar to Fig. 1 showing a slightly different form of dome and a different arrangement of supply conduits. Fig. 3 is a fragmentary sectional view showing a modified form of inlet structure giving the same effect as the structure shown in Fig. 2. Fig. 4 is a vertical sectional view showing a form of reaction vessel comprising an inverted bottle-shaped container. Fig. 5 is a similar view showing a reaction chamber made up of two concentric transparent domes and provided with means for introducing cooling fluid into the inner dome. Fig. 6 is a sectional view similar to Fig. 5, but showing a modified structure. Fig. 7 is a vertical sectional view of a form of device consisting of an inverted U tube, and Fig. 8 is a partly diagrammatic vertical sectional view of two associated reaction vessels provided with adjustable light-varying means constructed in accordance with my invention.

The apparatus herein shown is of particular advantage in bringing about reactions involving the use of chlorin or bromin, although the utility of this apparatus is by no means limited to such reactions. Chlorin, bromin and their reaction products, such as hydrochloric acid, chloroform and carbon tetrachlorid, vigorously attack many metals and most materials which are available for use in making sealed joints, such, for example, as cements, hard rubber and the like. It is therefore a matter of considerable difficulty to produce permanently tight joints between glass and other materials when the joints are to be subjected to the action of hot gaseous reagents of the above-mentioned character, as is the case in practising my photochemical process. If, for example, the reaction apparatus consists of parallel plates of glass alternately supported at opposite ends to provide a zig-zag passage for the reaction materials, it is found that the joints between the glass and their supporting members are quickly corroded, with consequent leakage of the gaseous contents of the apparatus. Even if clamped joints are formed between the glass and its supports and the joints packed with corrosion-resisting materials such as sheet lead, it is found to be exceedingly difficult to prevent leakage of gaseous reagents, particularly chlorin, which persistently finds its way through any joint that is not completely sealed.

I have discovered that highly satisfactory containers for carrying on photochemical reactions can be constructed from seamless vessels of glass or other transparent material, the necessary inlets and outlets being introduced into the interior of the reaction vessels through liquid seals. The best results are obtained when the liquids composing the seals consist of reaction products formed in the containers, in which case there is no tendency for the gaseous material undergoing reaction to react chemically upon the liquid composing the seal.

For a further understanding of my invention, reference may now be had to the figures of the drawings. In Figure 1, a dome 2 of glass, quartz, or other material that is pervious to the actinic rays employed, is shown inverted upon a shallow pan or tray 3 containing sealing liquid 4 and provided with inlet and outlet tubes 5 and 6 which extend through the bottom of the pan 3 and through the liquid therein to the interior of the dome 2. For such operations as the chlorination of hydrocarbons, the pan 3 and the conduits 5 and 6 may suitably be constructed of lead, tight joints between the conduits and the pan being produced by ordinary lead-burning methods. The pan 3 may be circular and of such a size as to surround the dome 2 or may be of such size that a series of the domes 2 may be supported thereon, one behind the other, with respect to a source of light.

Fig. 2 shows a structure which is similar in a general way to that shown in Fig. 1, but comprising a dome 7 that is taller in proportion to its width than the dome 2. In this figure, also, the inlet conduit 5 is extended nearly to the top of the dome 7 in order to insure the passage of the reaction materials through the full vertical length of the dome. A variation of this construction giving the same result is shown in Fig. 3, in which a tube 8, suitably of glass and of larger diameter than the inlet tube 5, is laid over the latter tube and extends to such height within the dome 7 as may be desired. The tube 8 may be of any suitable diameter, and in some cases I find it advantageous to make this tube nearly as wide as the outer dome 7, thereby causing the reaction materials to descend from top to bottom of the dome in a relatively thin layer.

Fig. 4 shows a modified form of device in which the reaction vessel consists of an inverted bottle-shaped container 9 which, by reason of the reduced size of its neck opening, may be supported upon a pan 3 of smaller dimensions than those required for the other forms of device which I have described.

Fig. 5 shows a form of apparatus consisting of two domes 10 and 11 disposed one within the other and both resting upon an annular pan or tray having up-turned inner and outer flanges and provided with inlet and outlet tubes 13 and 14. A tube 15 extends through the central opening of the tray 12 and into the interior of the inner dome 11, and air or other cooling fluid may be blown into the dome 11 through this tube. This form of device may also be arranged in batteries of two or more sets of domes supported upon a single pan or tray, in which case flanged openings are provided in the pan at suitable intervals to receive the air pipes 15.

Fig. 6 shows an arrangement which is similar to Fig. 5 except that a mercury vapor lamp 40 is substituted for the ventilating tube 15, and that the annular tray 16 which supports the domes 10 and 11 is composed of earthenware, porcelain or other suitable chemically inert material. In this case, the inlet and outlet tubes 13 and 14 are firmly secured in suitable openings in the tray 16 by means of rubber stoppers 17, which are covered by the liquid seals during the operation of the apparatus and are therefore protected from the hot, corroding gases in the cell. The mercury vapor lamp, or other light source, is inclosed within the inner globe, as shown in Fig. 6, for treating very inert materials which do not react except under the influence of intense light. In this case, the outer globe 10 need not be composed of transparent material, but may, for example, be made of sheet lead or other metal. It should be surrounded with a jacket 41, within which heating or cooling fluid may be introduced.

Fig. 7 shows a form of device consisting of an inverted transparent U tube 18, the ends of which are supported in pans or trays 19 containing sealing liquid 20 and provided with inlet and outlet tubes 21 extending through the pans 19 and the seals 20 into the ends of the tube. Separate pans 19 may be provided or the tube may be supported upon a single pan of the construction shown in Figs. 1 and 4.

When reaction devices such as those which I have herein shown are used for different purposes and in different arrangements, it is desirable to provide means for varying the intensity of the light that falls upon different parts of the reaction vessel and upon the different reaction vessels composing a series. An arrangement for accomplishing this result is illustrated in Fig. 8, in which two liquid-sealed domes 25 are arranged one behind the other with respect to a source of light, indicated as a mercury vapor lamp 26. Between each of the domes and the source of light, I provide screens 27, which, as shown, are arranged in oppositely movable pairs supported above and below, for both upward and downward movement. The screens 27 may consist of flexible sheet material adapted to be rolled and unrolled after the manner of window shades, or they may consist of rigid frames covered with suitable opaque or translucent material and provided with any convenient raising and lowering means. The domes 25, as shown, are connected in series with each other, and with such other domes as may belong to the same series, by means of pipes 28, 29 and 30, the pipe 29 being provided with a drain connection 31 adapted to deposit reaction products in a collecting vessel 32.

When my reaction units are arranged in sets of two or more, the entire structure may be inclosed in a ventilated casing 33, as indicated in Fig. 8. The casing 33 is divided into compartments by transverse glass partitions 34, and is provided with ventilating means consisting, as shown, of an air pipe 35 communicating with the top of the casing 33 and having a manifold branch 36 provided with connections 37 for blowing air into the inner domes of the set. The units composing a single installation of this kind may be as numerous as desired, within limits which are fixed by the actinic penetration of the light employed and the nature of the reaction that is to be performed. I have found that sets of six or seven domes, arranged one behind the other with respect to the light source, give good results in the chlorination of methane. The several domes composing a set may suitably be provided with means for applying heating or cooling fluids to them independently, since it is sometimes desirable to perform the successive stages of a reaction at different temperatures.

The structures which I have shown and described may be combined with one another and with other apparatus in various ways, and may be modified in many particulars as will be apparent to those skilled in the construction and operation of chemical apparatus. It is to be understood that the structural details herein shown are intended to be illustrative only and not as imposing restrictions upon my invention, which is limited only by the scope of the appended claims.

I claim as my invention:

1. Photochemical apparatus comprising a liquid-sealed transparent container provided with a fluid inlet and a fluid outlet.

2. Photochemical apparatus comprising a seamless, liquid-sealed, transparent container provided with a fluid inlet and a fluid outlet.

3. Photochemical apparatus comprising a transparent container, a liquid seal therefor, and fluid inlet and outlet conduits extending through the said seal into the interior of the said container.

4. Photochemical apparatus comprising a seamless transparent container, a liquid seal therefor, and fluid inlet and outlet tubes extending through the said seal into the interior of the said container.

5. Photochemical apparatus comprising a dome disposed with its edge immersed in a liquid, and fluid inlet and outlet tubes extending through the said liquid into the interior of the said container.

6. Photochemical apparatus comprising a liquid receptacle, a dome adapted to be supported by the said receptacle with its edge immersed in liquid, and fluid inlet and outlet conduits extending through the said receptacle and adapted to enter the said dome.

7. Photochemical apparatus comprising a shallow pan or tray, a transparent dome of glass or the like adapted to rest thereon, and fluid inlet and outlet conduits extending through the bottom of the said pan and adapted to enter the said dome.

8. Chemical reaction apparatus comprising an annular pan or tray adapted to contain sealing liquid, a plurality of dome-shaped members resting upon the said pan, one within the other, and fluid inlet and outlet conduits extending through the said pan and between the said dome-shaped members.

9. Chemical reaction apparatus comprising an annular pan or tray adapted to contain sealing liquid, two dome-shaped members resting upon the said pan, one within the other, fluid inlet and outlet conduits extending through the said pan and into the space between the said domes, and means for introducing cooling fluid into the inner dome-shaped member.

10. Photochemical apparatus comprising an annular pan or tray adapted to contain sealing liquid, two transparent domes, resting upon the said pan, one within the other, and fluid inlet and outlet conduits extending through the said pan and into the space between the said domes.

11. Photochemical apparatus comprising an annular pan or tray adapted to contain sealing liquid, two transparent domes resting upon the said pan, one within the other, fluid-inlet and outlet conduits extending through the said pan and into the space between the said domes, and a tubular member extending through the central opening in the said pan and into the inner dome for introducing cooling fluid therein.

12. Photochemical apparatus comprising a source of light, a transparent reaction vessel, and an adjustable screen adapted to be interposed between the said source of light and the said vessel.

13. Photochemical apparatus comprising a source of light, a transparent reaction vessel and an adjustable translucent screen adapted to be interposed between the said source of light and the said vessel.

14. Photochemical apparatus comprising a source of light, a transparent container for reaction materials, and a plurality of separately adjustable screens adapted to be interposed between the said source of light and the said vessel.

15. Photochemical apparatus comprising a source of light, a transparent container for reaction materials and a screen interposed between the said source of light and adapted to alter the quantity, but not the quality, of the light reaching the said vessel.

16. Photochemical apparatus comprising a source of light, a transparent container for reaction materials and a plurality of oppositely movable and independently adjustable screens adapted to be interposed between the said source of light and the said container.

17. Photochemical apparatus comprising a source of light, a plurality of transparent reaction vessels and means for varying the application of light from the said source to the several reaction vessels.

18. Photochemical apparatus comprising a source of light, a plurality of transparent reaction vessels and means for independently varying the intensity and distribution of the light applied from the said source to the several reaction vessels.

19. Photochemical apparatus comprising a plurality of transparent reaction vessels arranged one behind the other with respect to a source of light, and a screen adapted to be interposed between each of the said reaction vessels and the light source.

20. Photochemical apparatus comprising a plurality of transparent reaction vessels and a plurality of independently adjustable screens associated with each of the said vessels.

21. Photochemical apparatus comprising a plurality of transparent reaction vessels arranged one behind the other with respect to a source of light, and a plurality of oppositely movable and independently adjustable screens adapted to be interposed between each of the said reaction vessels and the light source.

22. Photochemical apparatus comprising a plurality of transparent reaction vessels arranged one behind the other with respect to a source of light, and light-varying means associated with each of the said reaction vessels, each of the said light-varying means comprising a plurality of screens supported beyond the light-receiving surface of the vessel and severally adapted to be moved across the said vessel.

In testimony whereof, I have hereunto subscribed my name this 17th day of November 1916.

WALTER O. SNELLING.